United States Patent
Dhong et al.

(10) Patent No.: US 7,493,357 B2
(45) Date of Patent: Feb. 17, 2009

(54) RANDOM CARRY-IN FOR FLOATING-POINT OPERATIONS

(75) Inventors: Sang Hoo Dhong, Austin, TX (US); Harm Peter Hofstee, Austin, TX (US); Kevin Nowka, Round Rock, TX (US); Steven Douglas Posluszny, Round Rock, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 10/971,851

(22) Filed: Oct. 22, 2004

(65) Prior Publication Data
US 2005/0055185 A1    Mar. 10, 2005

Related U.S. Application Data

(62) Division of application No. 09/999,135, filed on Nov. 29, 2001, now Pat. No. 6,941,335.

(51) Int. Cl.
*G06F 7/44*      (2006.01)
*G06F 7/38*      (2006.01)

(52) U.S. Cl. ............................ 708/503; 708/497

(58) Field of Classification Search ............... 708/503, 708/497
See application file for complete search history.

(56) References Cited

U.S. PATENT DOCUMENTS

| | | | | |
|---|---|---|---|---|
| 5,276,634 A | * | 1/1994 | Suzuki et al. | 708/497 |
| 6,167,420 A | * | 12/2000 | Saishi et al. | 708/620 |
| 6,269,385 B1 | * | 7/2001 | Han et al. | 708/497 |

* cited by examiner

*Primary Examiner*—Tan V Mai
(74) *Attorney, Agent, or Firm*—Casimer K. Salys; Dillon & Yudell LLP (57) ABSTRACT

A method and apparatus for adding and multiplying floating-point operands such that a fixed-size mantissa result is produced. In accordance with the present addition method, the mantissa of a first floating-point operand is shifted in accordance with relative operand exponent information. Next, the first operand mantissa is added to the second operand mantissa. The addition step includes replacing a least significant non-overlapped portion of the first operand mantissa with a randomly-generated carry-in bit. In accordance with the multiplication method, a partial product array is generated from a pair of floating-point operand mantissas. Next, prior to compressing the partial product array into a compressed mantissa result, a lower-order bit portion of the partial product array is replaced with a randomly generated carry-in value.

7 Claims, 11 Drawing Sheets

Fig. 6B result 1 o o o o o o o result 0 o o o o o o o

RANDOM CARRY-IN FOR FLOATING-POINT OPERATIONS

This is a Division of application Ser. No. 09/999,135, filed Nov. 29, 2001 now U.S. Pat. No. 6,941,335.

BACKGROUND OF THE INVENTION

1. Technical Field

The present invention generally relates to processing floating-point arithmetic operations, and in particular to a method and system that eliminates the need for rounding floating point arithmetic results. More particularly, the present invention relates to a method and system for incorporating a random carry value into a floating-point mantissa operand within computer-driven addition, subtraction, and multiplication operations.

2. Description of the Related Art

For many data processing computations, the range of numbers utilized as operands, intermediate shifted results, and final results is very large. An effective technique for expanding and expressing such large numeric ranges is to express them in floating-point notation. A floating-point number is typically represented in a computer in three parts. The first part is a sign bit indicating the whether the number is a positive or a negative value. The second part contains a fraction, often referred to as the mantissa, and the third part designates the position of the radix point and is called the exponent. For example, the decimal number +5123.678 is represented in floating-point notation as +0.5123678 (fraction) and +04 (exponent). The value of the exponent in this example indicates that the actual position of the decimal point is four positions to the right of the indicated decimal point in the fraction. This representation is equivalent to the scientific notation expression $+0.5123678 \times 10^{+04}$. Floating-point representation is useful in many computer-aided computation applications because it increases the range of numbers that can be accommodated by limited register capacities.

Implementation of floating-point processing systems requires specialized hardware and software capable of implementing floating-point operations in a computer system that is primarily designed to process integers. A standard for binary floating-point arithmetic as implemented within many data processing systems is promulgated by the American National Standard Institute (ANSI) as ANSI/IEEE standard 754-1985, which is incorporated herein by reference. Among the issues addressed in this standard is an approach to rounding floating-point computation results. Rounding takes a number that is otherwise regarded as infinitely precise, such as a floating-point mantissa, and if necessary, modifies it to fit the logistical limitations of the in-memory representation specified by the standard.

The need for rounding floating-point results is particularly evident in computer-aided multiplication operations performed within digital signal processors (DSPs) and floating-point units implemented within minicomputers and microcomputers. In the case of DSP signal processing, floating-point addition/subtraction and multiplication circuits are utilized to perform high-speed addition, subtraction, and multiplication operations.

Figure 1:
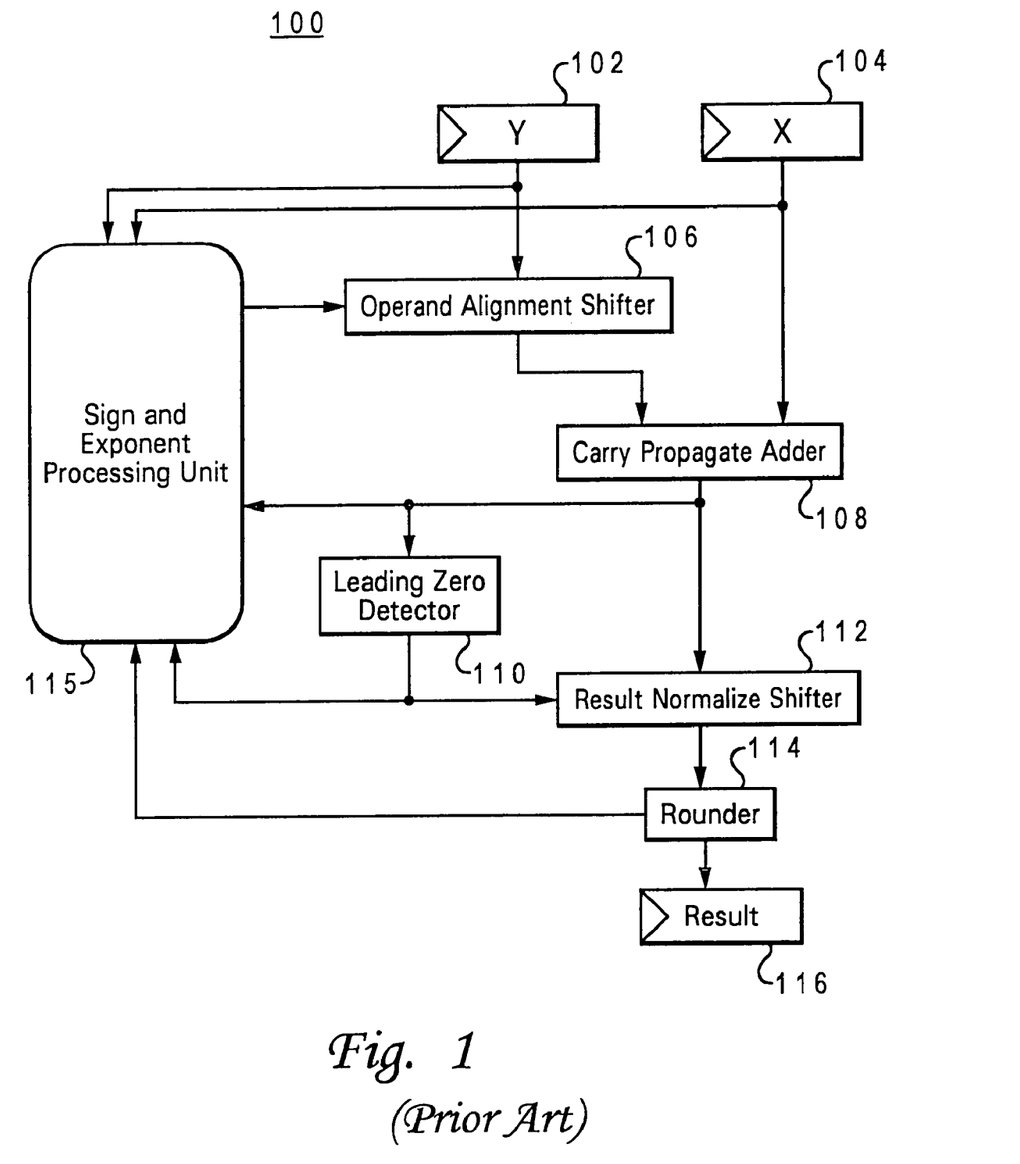
FIG. 1 depicts a conventional floating-point adder wherein the floating-point mantissa result is rounded.

A block diagram of a conventional floating-point adder in which rounding of floating-point results is utilized is illustrated in FIG. 1 as floating-point adder 100. As depicted in FIG. 1, floating-point adder 100 includes a pair of registers, 102 and 104, which contain the addend and augend mantissa values, Y and X, respectively, of the input addition operands. To properly align the mantissa bits of the operands, a sign and exponent processing unit 115 maintains the respective sign and exponent values for each of the input operands. In the depicted example, such alignment is achieved by shifting the mantissa value (either Y or X) having a smaller exponent value in an alignment shifter 106 in accordance with relative exponent information received from sign and exponent processing unit 115. The relative position of the bits for the mantissa value which has a smaller corresponding exponent is shifted to the right within alignment shifter 106 by the difference in exponent values between the two operands. In order to maintain acceptable precision, operand alignment shifter 106 must maintain sufficient bit positions to accommodate the shift without losing the original mantissa bit values.

The aligned mantissa operands are added within a carry propagate adder 108 and the resultant sum is applied to a leading zero detector 110 and a result normalize shifter 112 as well as sign and exponent processing unit 115. Leading zero detector 110 detects the number of leading zeros within the sum value within carry propagate adder 108 and delivers a corresponding exponent adjustment value to sign and exponent processing unit 115 such that the bit positions of the mantissa sum value can be shifted within result normalize shifter 112 by the number of bits specified in the adjustment value as required by the binary point convention implemented by floating-point adder 100.

The intermediate shifting function of operand alignment shifter 106 may need to shift the operand having a smaller exponent by up to the difference between the maximum representable exponent and the minimum representable exponent. Implementations of IEEE compliant adders extend the width of the shifted operand by two places and logically OR the mantissa bits which have been shifted beyond this extended register. The result of the ORing of the bits shifted beyond the two additional positions is referred to as a "sticky bit."

Thus, in order to accurately compute the final mantissa value, the adder must be three bits wider than the desired result width and additional register space is required to accommodate the additional bits in the shifted operand mantissa. In addition, the sticky bit must be computed and maintained during the add. Substantial hardware and processing overhead are required to accommodate this approach to maintaining floating-point accuracy. Referring back to FIG. 1, a rounding circuit 114 is required to reduce the relatively large number of bits in the floating-point mantissa result within result normalize shifter 112 to conform to a predetermined mantissa convention within a result register 116.

Figure 2:
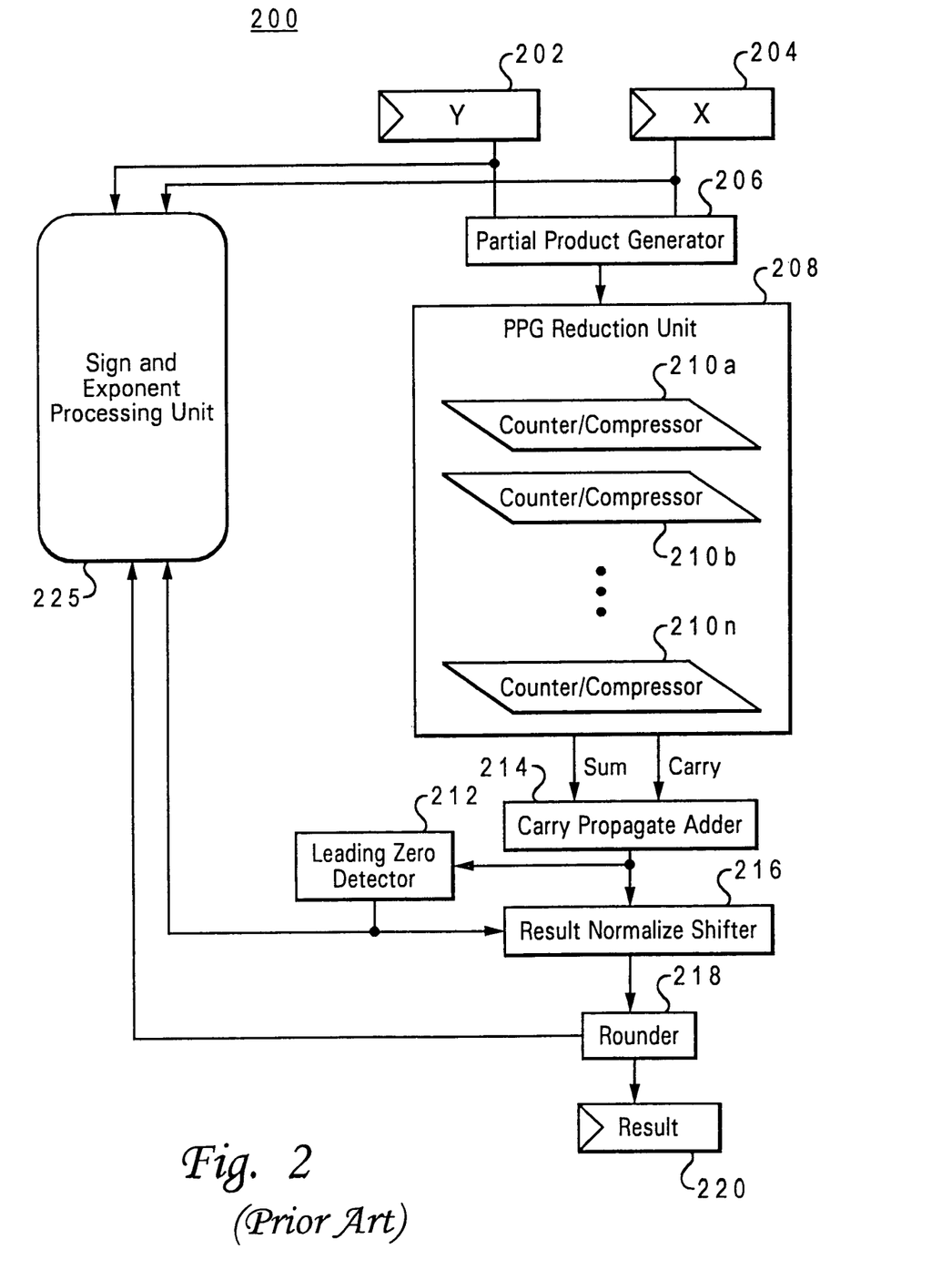
FIG. 2 illustrates a conventional floating-point multiplier wherein the floating-point mantissa result is rounded.

With reference to FIG. 2, there is depicted a conventional floating-point multiplier 200 that, like floating-point adder 100 requires rounding of the mantissa result. In the example depicted in FIG. 2 an n-bit multiplicand mantissa, Y, is multiplied by an n-bit multiplier mantissa, X, with a sign and exponent processing unit 225 maintaining the respective sign and exponent values for each of the input operands. A pair of registers, 202 and 204, store multiplicand multiplier mantissas Y and X, respectively, until floating-point multiplier 200 receives a "multiply" instruction whereupon registers 202 and 204 deliver the mantissa operands to the multiplication circuitry within floating-point multiplier 200.

The functionality of floating-point multiplication circuit 200 may be divided into two stages. The first stage includes a partial product generator 206 and a partial product reduction circuit 208, wherein partial product generation and carry-save addition (reduction) are performed. The logic required to implement the functionality of partial product generator 206 is well-known in the art and is therefore not explicitly depicted in FIG. 2. The second stage includes a carry propagate adder 214 that adds the redundant-form product and to generate a binary product.

Figure 3:
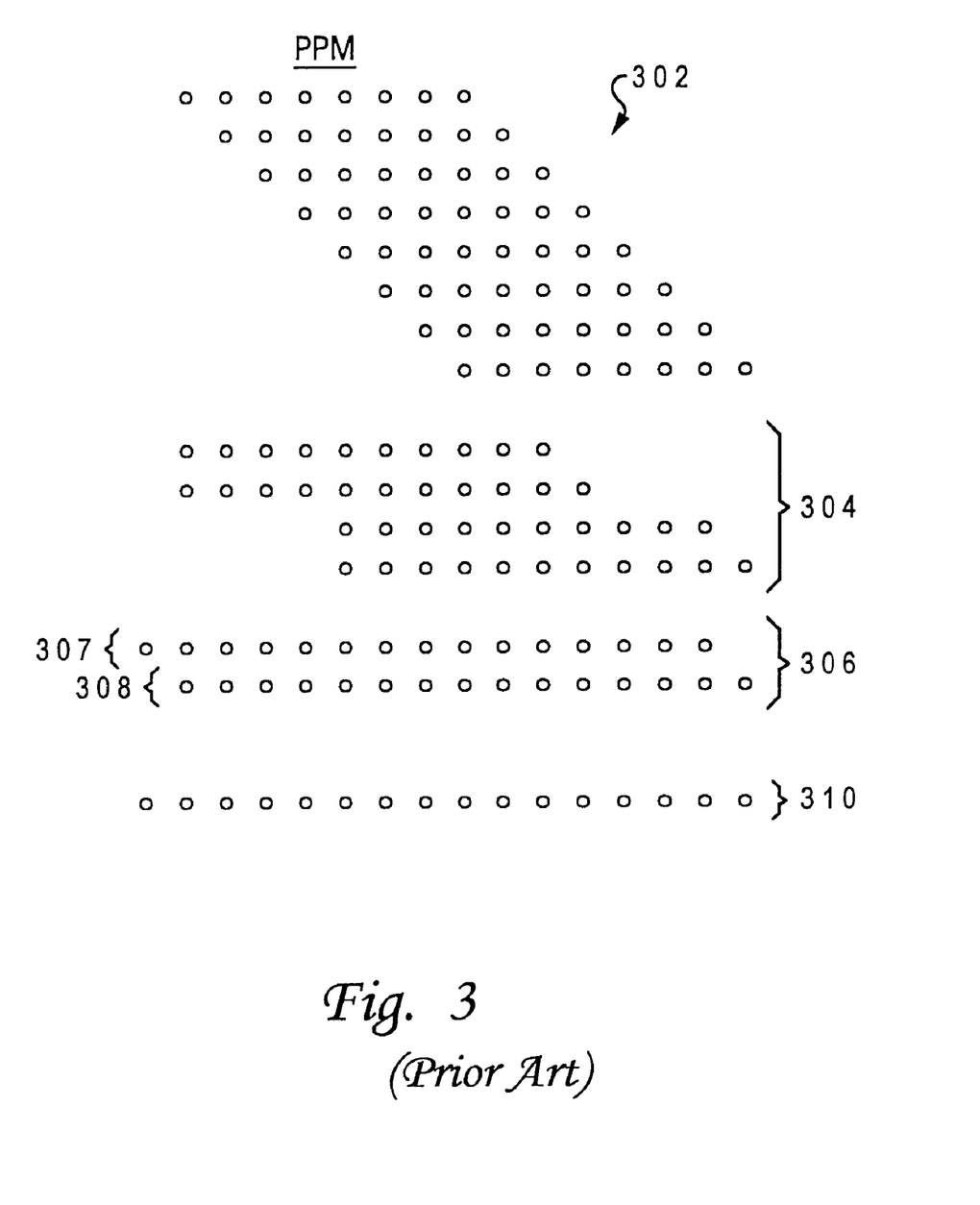
FIG. 3 depicts a reduction array and resultant compressed array results generated by the floating-point multiplication circuit depicted in FIG. 2.

Partial product generator 206 processes multiplicand mantissa Y and multiplier mantissa X to produce a partial product matrix (PPM) such as PPM 302 illustrated in FIG. 3. The individual partial product terms (represented as dots within PPM 302) are generated by partial product generator 206 in accordance with an algorithm selected from among many suitable algorithms known to those skilled in the art. In the depicted example, PPM 302 is an n-by-n array reflecting n-bit input mantissa operands.

Referring to FIG. 2 in conjunction with FIG. 3, PPM 302 is sequentially compressed utilizing a series of offset additions into a first reduced array 304 and a second reduced array 306 by a series of counter/compressors 210a-210n within partial product reduction unit 208. Assuming n-bit operands, counter/compressors 210a-210n must include at least 2n-bit wide registers to process PPM 302. Second reduced array 306 comprises the redundant (carry-save) form of a sum row 308 and a carry row 307, which are added within carry propagate adder 214 to form a 2n-bit product result 310. Similar to floating-point adder 100, floating-point multiplier 200 includes a result normalize shifter 216 that shifts result mantissa 310 in accordance with leading zero information from a leading zero detector 212.

The exponent value for result mantissa 310 is adjusted accordingly by sign and exponent processing unit 225. Similar to the sum mantissa result within result normalize shifter 112 of floating-point adder 100, product mantissa result 310 within normalize shifter 216 may require rounding to conform to a predetermined mantissa convention within a result register 220.

As applicable to the adder and multiplier implementations depicted in FIGS. 1 and 2, one approach to rounding floating-point results is to simply truncate the result at a designated bit position. This approach is generally unacceptable for most DSP and advanced floating-point operations because it introduces a bias toward zero over multiple operations. An alternate approach to floating-point rounding, known as "round to nearest," is set forth in ANSI/IEEE standard 754-1985. In accordance with the round to nearest rounding technique, the representable value nearest to the infinitely precise result is delivered as the result. Furthermore, if the two nearest representable results are equally near, the one having a least significant bit zero is delivered as the result.

The round to nearest rounding technique is both accurate and avoids any systematic reduction or inflation of the absolute value of a floating-point mantissa result. However, a considerable cost in terms of additional computation circuitry and latency is incurred in implementing the round to nearest rounding technique. The additional hardware overhead and latency is particularly problematic when imposed on already expensive multiplier designs having a computation and hardware-intensive nature.

From the foregoing, it can be appreciated that a need exists for an improved method and system for producing floating-point results in which acceptable precision is maintained within a limited number of bit positions. The present invention addresses such a need.

SUMMARY OF THE INVENTION

A method and apparatus for adding a first floating-point operand to a second floating-point operand such that a fixed-size mantissa result is produced are disclosed herein. In accordance with the present method the mantissa of a first floating-point operand is shifted in accordance with relative operand exponent information. Next, the first operand mantissa is added to the second operand mantissa. The addition step includes replacing a least significant non-overlapped portion of the first operand mantissa with a randomly-generated carry-in bit.

In an alternate embodiment the present invention discloses a method and apparatus for performing floating-point multiplication. In accordance with the alternate embodiment a partial product array is generated from a pair of floating-point operand mantissas. Next, prior to compressing the partial product array into a compressed mantissa result, a lower-order bit portion of the partial product array is replaced with a randomly generated carry-in value.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations maybe accomplished in view of these teachings without deviating from the spirit or scope of the present invention. Although, the present invention will be described herein in terms of a particular system and particular components, one of ordinary skill in the art will readily recognize that this method and system will operate effectively for other components in a data processing system.

The present invention provides a method and system for achieving acceptable floating-point result precision without the need for costly and latency-inducing overhead hardware required for implementing conventional rounding techniques such as the "round to nearest" method set forth in ANSI/IEEE standard 754-1985. As explained in greater detail below, the present invention employs random carry-in logic within a floating-point computation device to dispense with the hardware and processing overhead required to round a floating-point result.

Figure 4:
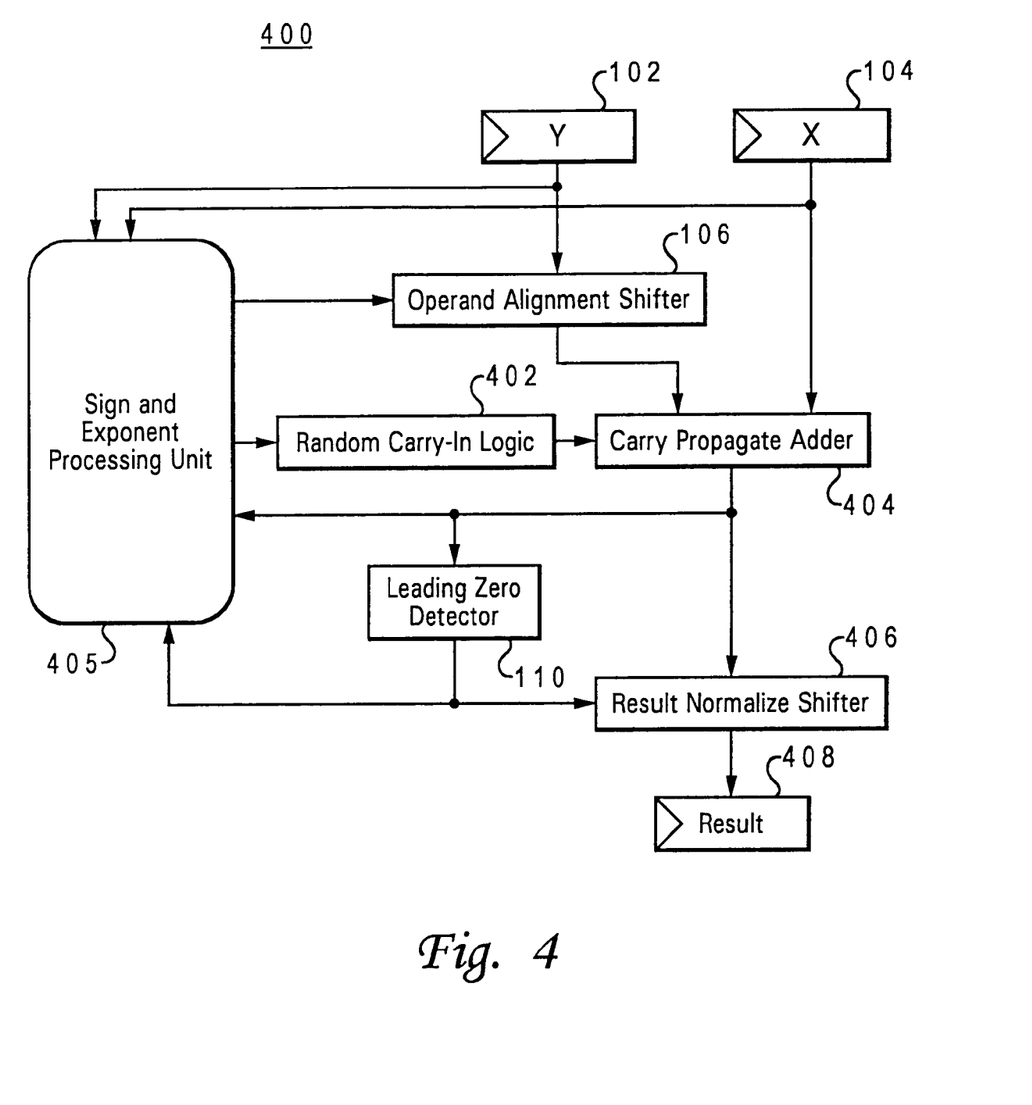
FIG. 4 illustrates a floating-point adder incorporating random carry-in logic in accordance with a preferred embodiment of the present invention.

With reference now to the figures wherein like reference numerals refer to like and corresponding parts throughout, and in particular with reference to FIG. 4, there is illustrated a floating-point adder 400 incorporating random carry-in logic in accordance with a preferred embodiment of the present invention. As with the convention floating-point adder depicted in FIG. 1, floating-point adder 400 includes input mantissa operand registers, 102 and 104, which contain the addend and augend mantissa values, Y and X, respectively. To properly align the operand mantissas, a sign and exponent processing unit 405 maintains the respective sign and exponent values for each of the input operands. Similar to floating-point adder 100 of FIG. 1, such alignment is achieved within floating-point adder 400 by shifting the operand mantissa (either Y or X) which has a smaller exponent within alignment shifter 106 in accordance with relative exponent information received input from sign and exponent processing unit 405.

As further illustrated in FIG. 4, floating-point adder 400 includes a random carry-in logic unit 402, which, in accordance with the principles of the invention set forth herein, eliminates the need for a rounding function such as that performed by rounding circuit 114 in conventional floating-point adder 100. Random carry-in logic unit 402 provides, when appropriate, a randomly generated least significant carry-in value to a carry propagate adder 404. As explained in further detail below, this randomly generated least significant carry-in value is employed under specific circumstances defined by the nature of the required shift or lack thereof performed by operand alignment shifter 106. In the exemplary embodiment depicted in FIG. 4, the requisite shift information is obtained by random carry-in logic unit 402 from exponent and sign information provided by sign and exponent processing unit 405.

Figure 5A:
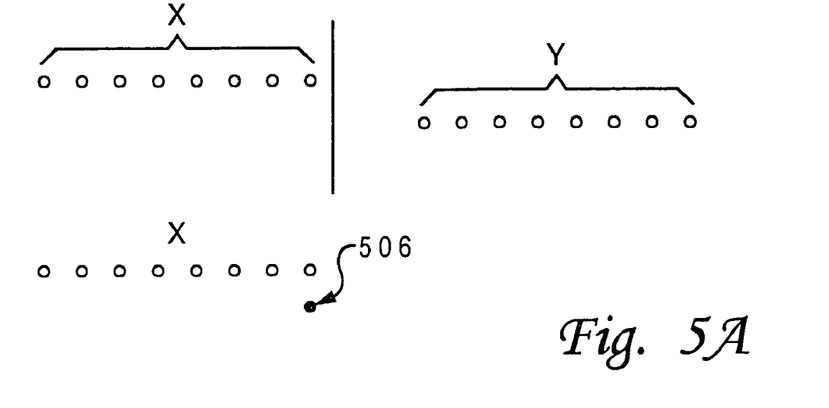
FIGS. 5A-5C depict relative operand overlap as applicable to implementation of the floating-point adder shown in FIG. 4.
Figure 5B:
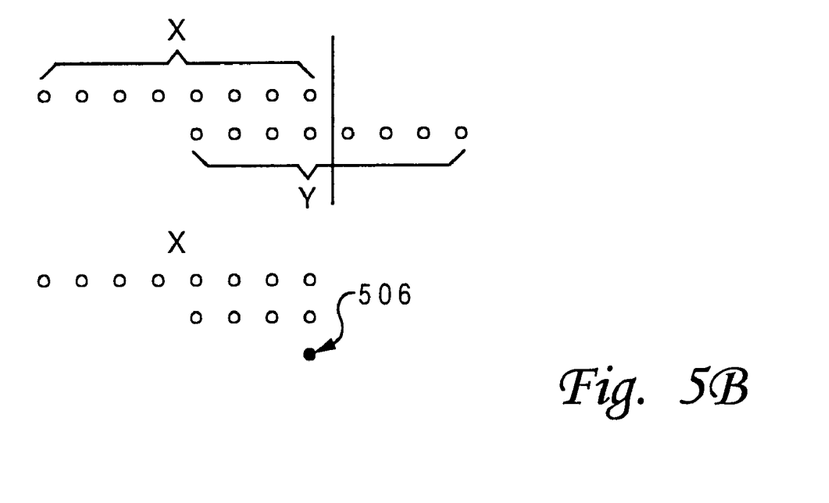
Figure 5C:
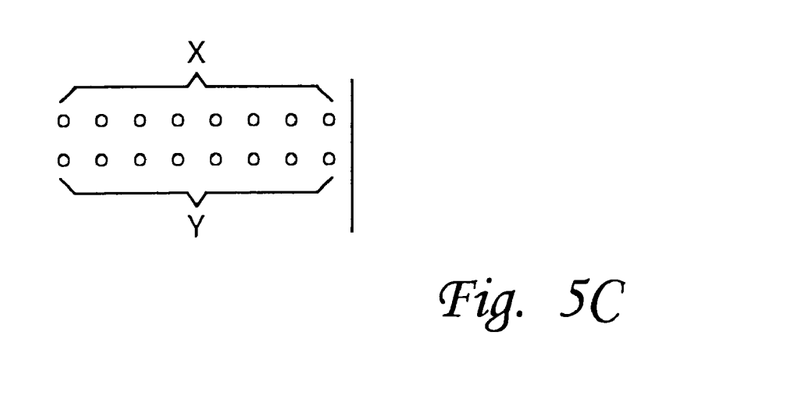

Referring now to FIGS. 5A-5C, there are depicted three possible operand overlap situations as may result from the shifting of addend Y within operand alignment shifter 106. Specifically, FIG. 5A depicts mantissa operand X and shifted mantissa operand Y. When the relative difference in the operand exponents is sufficiently large, the operand mantissa's are non-overlapped as illustrated in FIG. 5A. In the depicted embodiment, both mantissa operands are n bits wide, and as depicted in FIG. 5A, Y has been shifted by a number of bits greater than n. In response to detecting a non-overlapping condition such as that depicted in FIG. 5A, and in accordance with an important feature of the embodiment shown in FIG. 4, random carry-in logic unit 402 provides a random bit value 506, which is incorporated as a carry-in value added to the least significant bit position (i.e. the $(n-1)^{th}$ bit position of bits 0 through n−1) of mantissa operand X. In this manner, random carry-in logic unit 402 provides a least significant bit which effectively replaces the lesser significant mantissa operand Y at the carry propagate adder stage (i.e. within carry propagate adder 404) within floating-point adder 400.

FIG. 5B illustrates an alternative situation in which the difference in operand exponents is non-zero but less than n, resulting in an overlap between mantissa operand X and shifted mantissa operand Y. As depicted in FIG. 5B, in response to random carry-in logic unit 402 detecting an overlapped condition from exponent information from sign and exponent processing unit 405, a truncated most-significant portion of shifted lesser significant mantissa operand Y is added to non-shifted operand X. In the depicted embodiment, if the required shift is m bits, the most significant n-m bits of the lesser significant operand is delivered to carry propagate adder 404 to be added to the entire greater significant mantissa operand. In addition, random carry-in logic unit 402 provides random bit value 506, which is added at the least significant bit position, and which effectively replaces the least significant m bits that are not carried forward to carry propagate adder 404.

FIG. 5C depicts a third alternative situation in which the operand exponents are equal and thus no mantissa overlap occurs. In this situation, there is no shift performed by operand alignment shifter 106 and no subsequent need for rounding the resultant sum within register 408. In such a case, and as illustrated in FIG. 5C, no carry-in bit from random carry-in logic unit 402 is needed or provided.

Figure 6A:
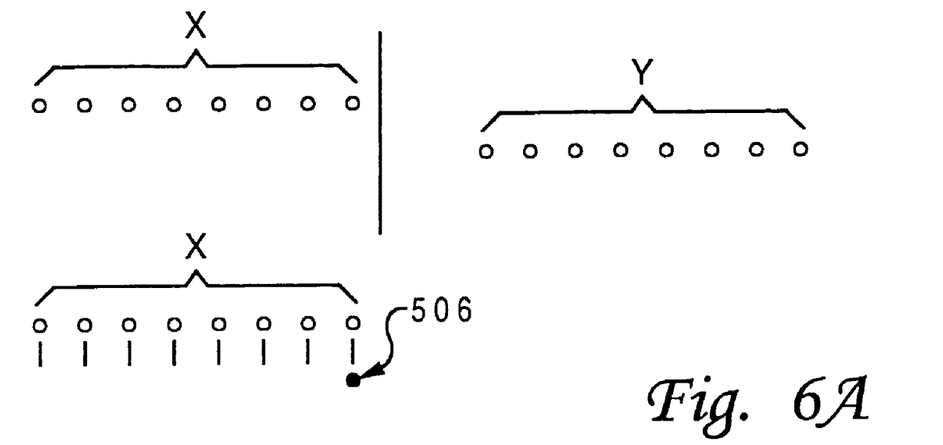
FIGS. 6A-6D illustrate relative operand overlap as applicable to implementation of the floating-point adder shown in FIG. 4 when performing effective subtract operations.

Floating-point adder 400 can also be utilized for effective subtract operations using well-known complementary add operations within carry propagate adder 404. The implementation of random carry-in logic unit 402 as applied to effective subtract operations is described with reference to FIG. 4 in conjunction with FIGS. 6A-D. Referring to FIG. 6A, the non-overlapped effective subtract situation is depicted in which a shifted lesser significant mantissa operand Y is being subtracted from non-shifted mantissa operand X. As in the case of effective addition of non-overlapped mantissa operands explained with reference to FIG. 5A, responsive to detecting the non-overlapped condition, random carry-in logic unit 402 provides random bit value 506, which is incorporated as a carry-in value added to the least significant bit position (i.e. the $(n-1)^{th}$ bit position of bits 0 through n−1) of mantissa operand X. For a subtract operation implementing complementary addition, the bit values of shifted operand Y aligned with the bit positions of mantissa operand X are inverted as illustrated in FIG. 6A. The effective subtraction is thus performed within carry propagate adder 404 by adding n-bit mantissa operand X to a corresponding n-bit row of ones, with random carry-in logic unit 402 providing a least significant carry-in bit which effectively replaces the lesser significant mantissa operand Y.

Figure 6B:
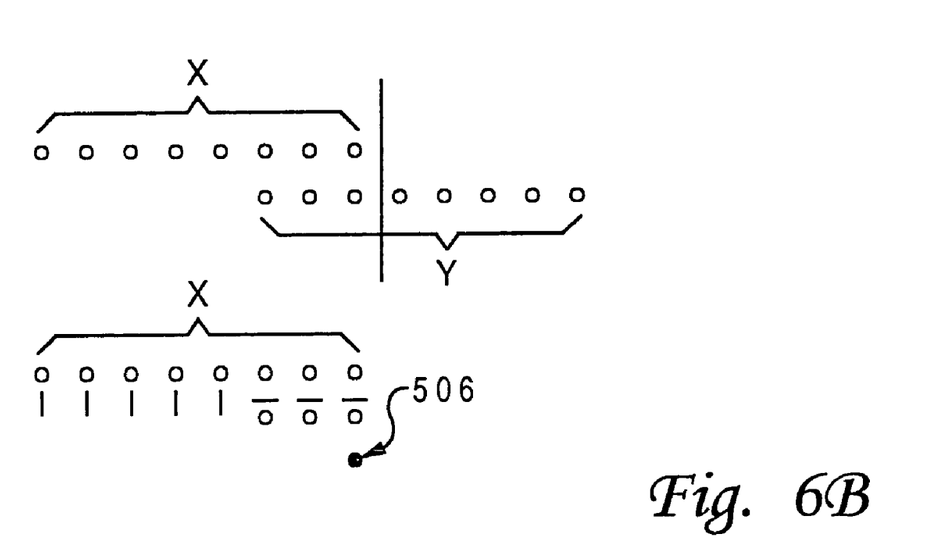

FIG. 6B illustrates an effective subtract in which random carry-in logic unit 402 responds to overlapping operands. Similar to the overlapped addition depicted in FIG. 5B, an overlap condition is detected for n-bit mantissas when the difference in operand exponents is non-zero but less than n, resulting in an overlap between mantissa operand X and shifted mantissa operand Y. As depicted in FIG. 6B, in response to random carry-in logic unit 402 detecting an overlapped condition from exponent information from sign and exponent processing unit 405, a truncated most-significant portion of shifted lesser significant mantissa operand Y is first inverted and then added to corresponding bit positions of non-shifted operand X. In the depicted embodiment, if the required shift is m bits, the most significant n-m bits of the lesser significant operand is delivered to carry propagate adder 404 to be added to the entire greater significant mantissa operand. In addition, random carry-in logic unit 402 provides random bit value 506, which effectively replaces the least significant m bits that are not carried forward to carry propagate adder 404.

Figure 6C:
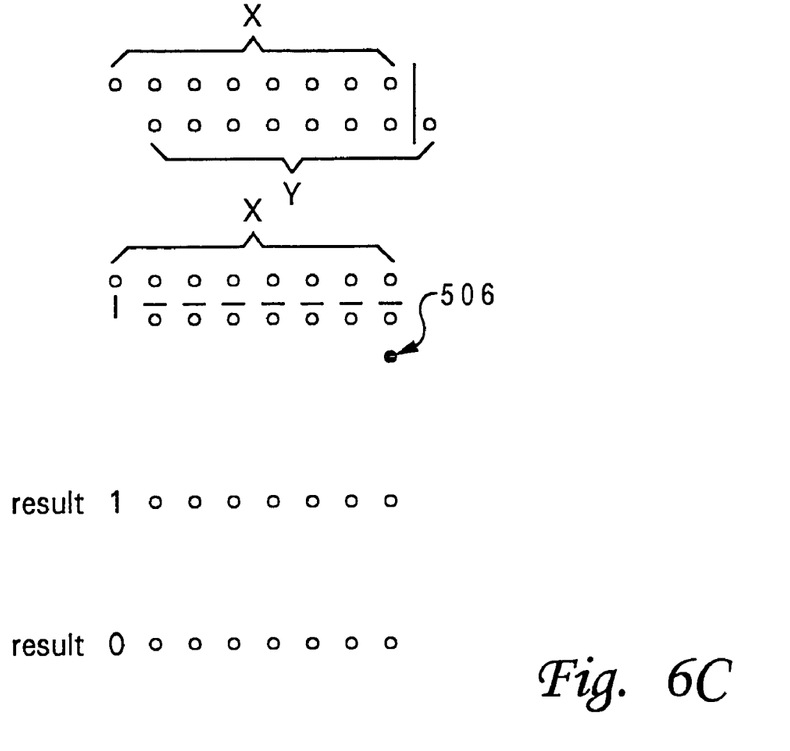

A problem may arise, however, in some overlapped subtract situations in which the randomly generated carry-in bit may have a significant and potentially erroneous effect on the final subtract result. Such a situation is depicted in FIG. 6C wherein the mantissa operands overlap by a single bit position. The single-bit overlap situation may result in a massive digit cancellation if the lesser significant shifted mantissa operand Y is very close in value to the non-shifted mantissa operand X. For example, if mantissa operand X is an 8-bit value represented as 1.0000000 and mantissa operand Y is represented as 1.1111111, and further assuming that Y is shifted one bit position to the right, the resultant difference value obtained within carry propagate adder 404 with a random carry-in of zero is 0.0000000. If, in the same situation, the random carry-in is one, the result within carry propagate adder 404 is 0.0000001. Both results differ significantly from the infinitely precise result of 0.00000001. Thus, a randomly generated carry-in value added to the least significant bit of a massively canceled difference may result in the introduction of a potentially significant error. It should be noted that the leading 1-bit in non-shifted mantissa operand X will be maintained in the resultant difference value for cases in which the subtraction does not result in digit cancellation.

In accordance with the embodiment depicted by FIG. 4 in conjunction with FIG. 6C, the leading bit position of the result within carry propagate adder 404 must be checked in the case of a single-bit overlap subtraction operation to ascertain whether or not a digit cancellation has occurred. If the resultant difference value within carry propagate adder 404 has a leading 1, no digit cancellation has occurred and the difference inclusive of the random carry-in bit from random carry-in logic unit 402 is delivered for further processing within result normalize shifter 406. If, however, a resultant difference within carry-propagate adder 404 has a leading zero, the subtraction is repeated with both operand mantissas shifted by the number of leading zeros in the result.

Figure 9:
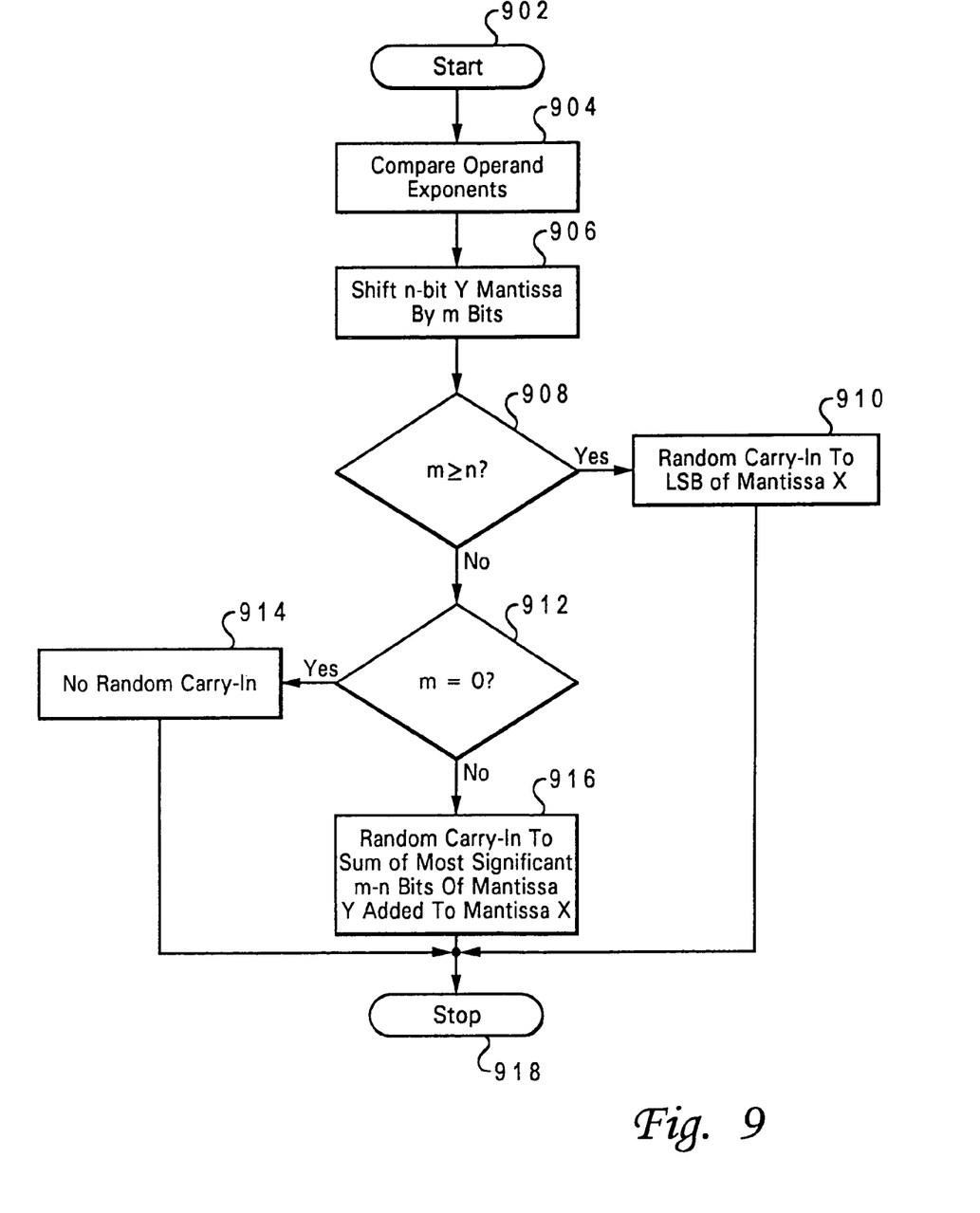
FIG. 9 is a flow diagram depicting a floating-point addition process in which a random carry-in bit is utilized in accordance with a preferred embodiment of the present invention.

A step-wise process for implementing a random carry-in value during a floating-point addition in accordance with the invention disclosed herein is illustrated in FIG. 9. The process begins as shown at step 902 and proceeds to step 904, wherein is depicted a comparison of the exponents associated with mantissas Y and X within sign and exponent processing unit 405. Next, as illustrated at step 906, n-bit mantissa Y is shifted within alignment shifter 106 by m bits in accordance with the results of the exponent comparison performed at step 904. The value of m will determine, as previously illustrated in FIGS. 5A-C, which portion, if any, of mantissa Y will be added to mantissa X within carry propagate adder 404.

If, as depicted at steps 908 and 910, shift value m is greater than or equal to n (i.e. a non-overlapped condition as shown in FIG. 5A), the addition within carry propagate adder 404 consists of adding a randomly-generated bit value from random carry-in logic unit 402 to mantissa X, without any bits from mantissa Y included in the add. Step 912, which may be performed prior to or subsequent to step 908, illustrates a determination of whether or not m equals zero (indicative of whether the operand exponents were originally equal prior to the exponential alignment required for mantissa addition). If so, and as depicted at step 914, mantissa Y is added to mantissa X without a random carry-in. If, however, the value of m is between n and zero, a random carry-in bit from random carry-in logic unit 402 is added in the least significant bit position together with mantissa X and the most significant m-n bits of mantissa Y (step 916). Each of the three possible addition operations illustrated at steps 910, 914, and 916 terminate as shown at step 918.

Figure 10:
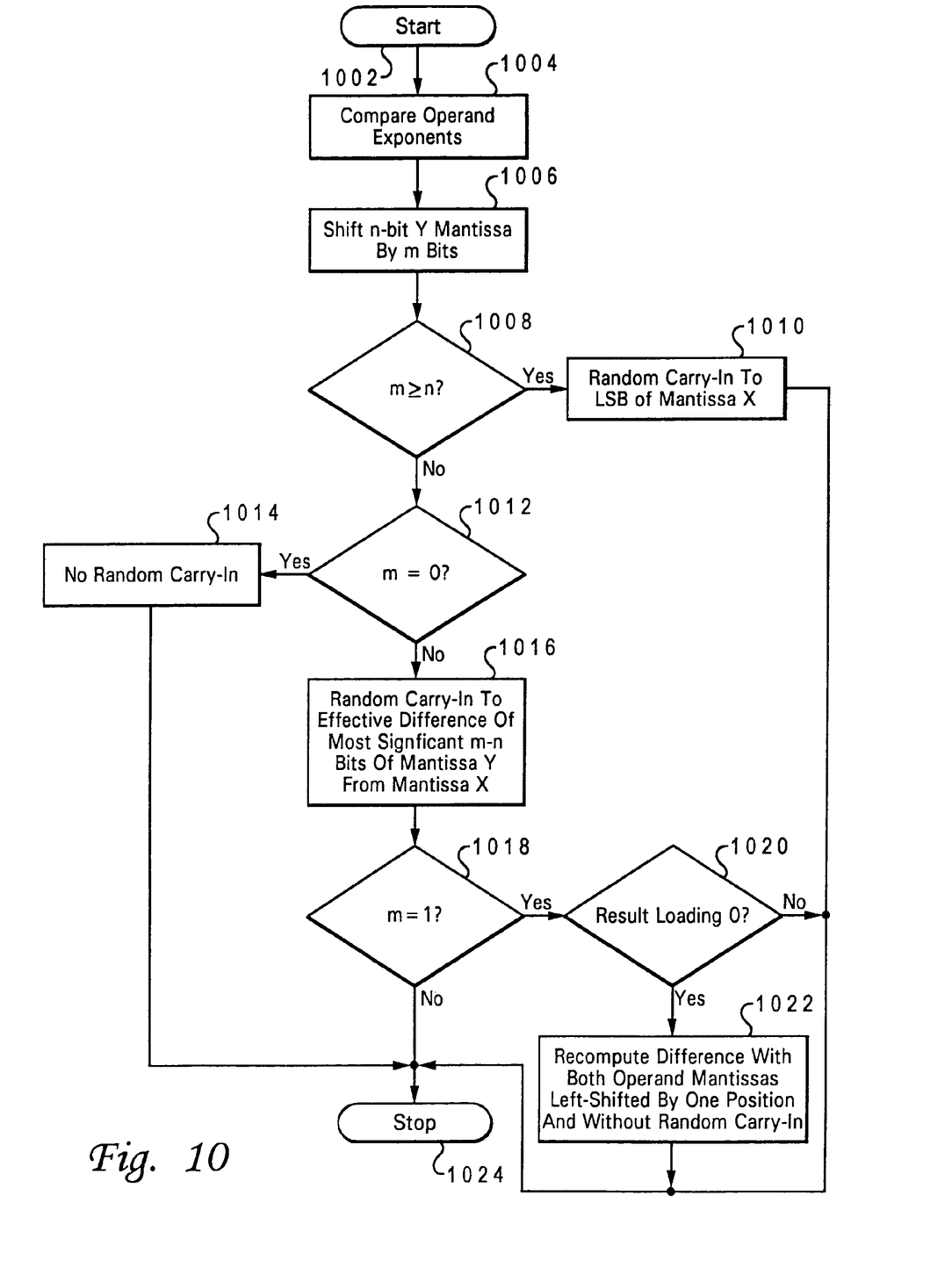
FIG. 10 is a flow diagram illustrating an effective subtraction process in which a random carry-in bit is employed in accordance with a preferred embodiment of the present invention.

Referring to FIG. 10, there is depicted a flow diagram illustrating an effective subtraction process performed within floating-point adder 400 in which a random carry-in bit is employed in accordance with a preferred embodiment of the present invention. Following initiation of the effective subtraction process at step 1002, the exponents associated with mantissas Y and X are compared within sign and exponent unit 405 as illustrated at step 1004. Next, as depicted at step 1006, n-bit mantissa Y is shifted within alignment shifter 106 by m bits in accordance with the results of the exponent comparison performed at step 1004. The value of m will determine, as previously explained with reference to FIGS. 6A-D, which portion, if any, of mantissa Y will be subtracted from mantissa X within carry propagate adder 404.

Figure 6D:
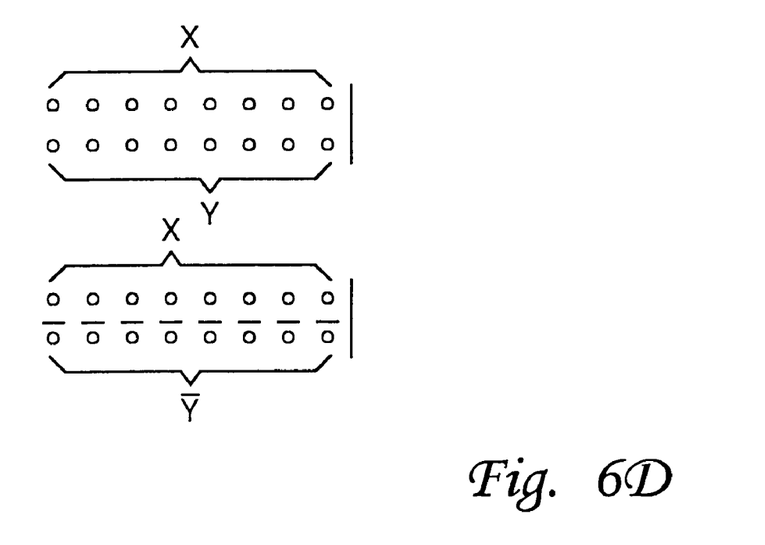

If, as depicted at steps 1008 and 1010, shift value m is greater than or equal to n (i.e. a non-overlapped condition as shown in FIG. 6A), the effective subtraction performed within carry propagate adder 404 consists of adding a randomly-generated bit value from random carry-in logic unit 402 to mantissa X, along with the complement leading zero bits preceding mantissa Y. Step 1012, which may be performed prior to or subsequent to step 1008, illustrates a determination of whether or not m equals zero (indicative of whether the operand exponents were originally equal prior to the exponential alignment required for mantissa addition). If so, and as depicted at step 1014, mantissa Y is subtracted (an effective subtraction utilizing addition of complemented values as shown in FIG. 6D) from mantissa X without a random carry-in. If, however, the value of m is between n and zero, a random carry-in bit from random carry-in logic unit 402 is added in the least significant bit position of the effective subtraction consisting of adding the most significant, complemented m-n bits of mantissa Y from mantissa X (step 1016).

As explained with reference to FIG. 6C, an effective subtraction performed with respect to operands overlapped by a single bit presents the possibility of digit cancellation wherein the random-generated carry-in may introduce a disproportionate error into the difference result. Therefore, as illustrated at step 1018, a determination is made of whether or not the shift value is one. If so, a further determination is made as shown at step 1020 of whether or not the value of the leading bit of the difference obtained from step 1016 is indicative of a digit cancellation condition. Consistent with conventional operand convention, and as illustrated at step 1020, a leading zero is defined as the condition indicating that digit cancellation has occurred, and that, as depicted at step 1022, the difference must be re-computed with both operand mantissas left-shifted by one bit position, their exponents decremented accordingly, and without a random carry-in. If the leading result bit is not zero, the difference result obtained from step 1016 is maintained and the process terminates as for each of the three alternative effective subtraction operations illustrated at steps 1010, 1014, and 1022 as shown at step 1024.

Figure 7:
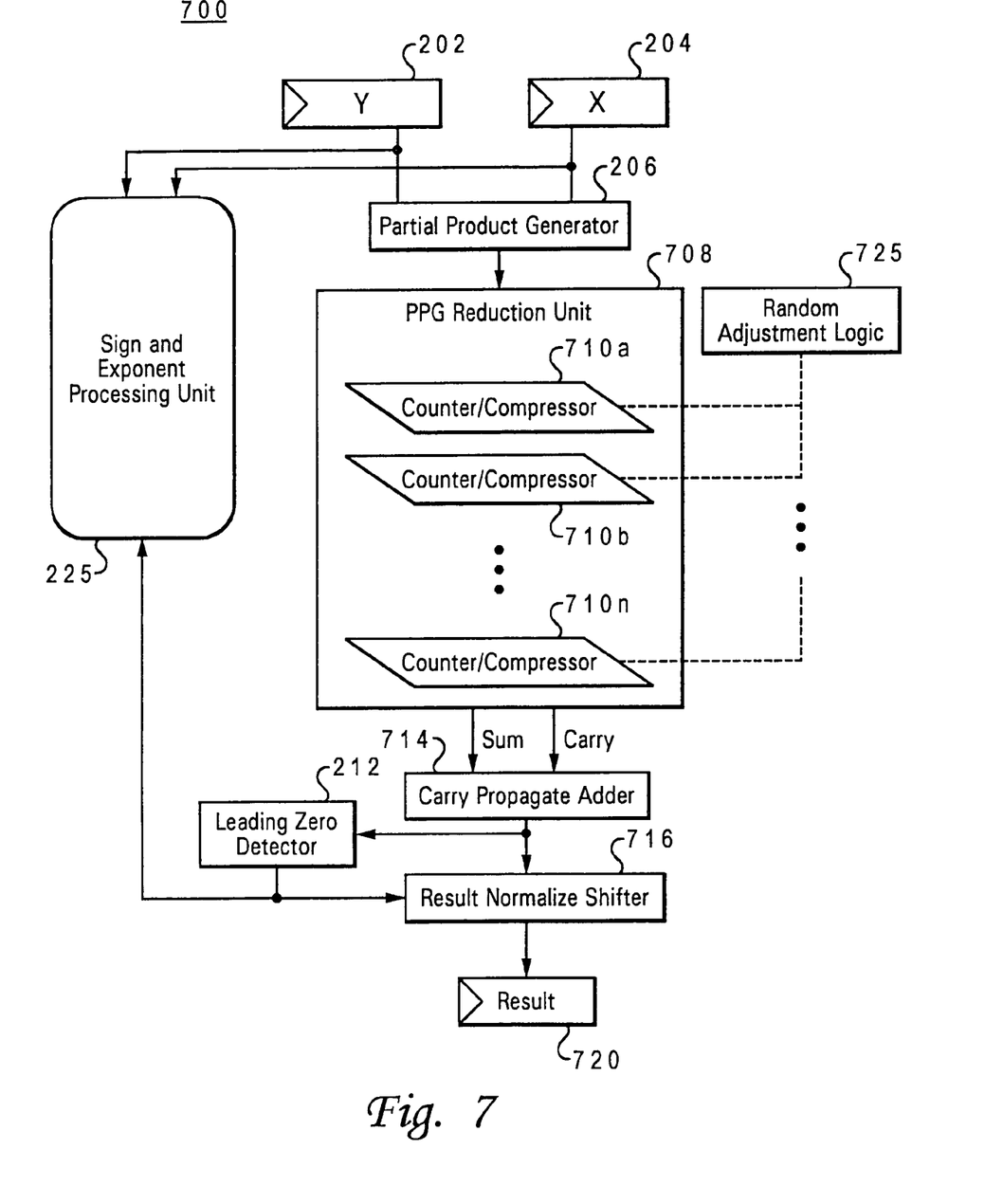
FIG. 7 depicts a floating-point multiplier incorporating random carry-in logic in accordance with a preferred embodiment of the present invention.

With reference to FIG. 7 depicts a floating-point multiplier 700 incorporating random carry-in logic in accordance with a preferred embodiment of the present invention. Floating-point multiplier 700 includes much of the functionality depicted and explained with reference to conventional floating-point multiplier 200 in FIG. 2. Similar to conventional floating-point adder 200, the depicted embodiment includes n-bit multiplicand mantissa, Y, multiplied by n-bit multiplier mantissa, X, with sign and exponent processing unit 225 maintaining the respective sign and exponent values for each of the input operands. Registers, 202 and 204, store multiplicand multiplier mantissas Y and X, respectively, until floating-point multiplier 200 receives a "multiply" instruction whereupon registers 202 and 204 deliver the mantissa operands to the multiplication circuitry within floating-point multiplier 700.

Floating-point multiplier 700, like conventional floating-point multiplier 200, includes partial product generator 206 which processes multiplicand mantissa Y and multiplier mantissa X to produce a partial product matrix (PPM). In the depicted embodiment and with reference to FIG. 8, such a PPM is depicted as PPM 802. The individual partial product terms (represented as dots within PPM 802) are generated by partial product generator 206 in accordance with an algorithm selected from among many suitable algorithms known to those skilled in the art. In the depicted example, PPM 802 is an n-by-n array reflecting n-bit input mantissa operands.

The method employed by conventional floating-point multiplier 200 during sequential compression of PPM 302 requires 2n-bit registers within counter/compressors 210a-210n and carry propagate adder 214 for processing the series of offset additions. In accordance with an important feature of the present invention, floating-point multiplier 700 implements a random adjustment logic unit 725 that eliminates the need for double-wide registers within a set of counter/compressors 710a-710n, which in the depicted embodiment may be n bits wide or slightly larger.

Referring back to FIG. 8, PPM 802 is divided into a set of higher-order bits 806 and a set of lower order bits 804 at a boundary defined by the least significant bit 810 of the uppermost row 808 and the most significant bit 814 of the lowermost row 812 of PPM 802. In accordance with the embodiments depicted in FIGS. 7 and 8, lower-order bits 804, and/or subsequent sets of similarly situated lower-order bits within the resultant reduction arrays within partial product reduction unit 208, which would otherwise be carried forward within counter/compressors 710a-710n and eventually be represented as an "error" in rounding the subsequent product result, are replaced in one or more of counter/compressors 710a-710n by a random carry-in value 815 generated by random adjustment logic unit 725.

Figure 8:
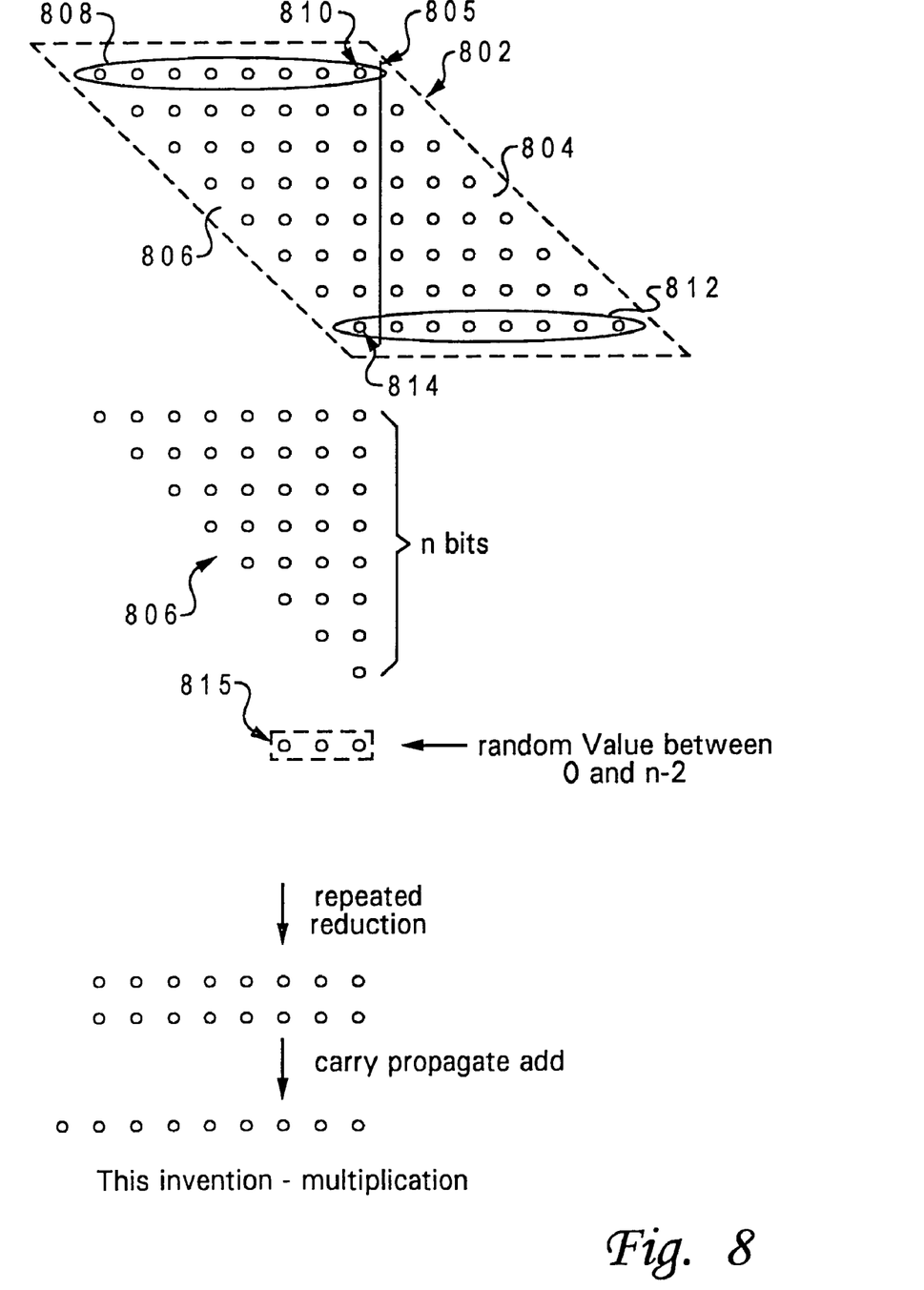
FIG. 8 illustrates a reduction array and resultant compressed array results generated by the floating-point multiplier depicted in FIG. 7.

In accordance with a preferred embodiment of the present invention, random carry-in value 815 is randomly generated (or pseudo-randomly generated, as by linear feedback shift register principles for example) between a lower bound of zero and an upper bound determined in accordance the height of the object partial product array to which the carry-in is applied. Applying binary mathematical principles to determine a requisite number of bit positions that provides a suitable range of random carry-in values, it has presently been determined as a feature of the present invention that an adequate amelioration of the error introduced by eliminating lower-order bits (situated within a partial product array similarly to lower-order bits 804) from a PPM having a height (as determined by the least significant bit position of the uppermost row and the most significant bit position of the lowermost row) of N total bit positions, can be achieved utilizing a randomly generated binary value having a value between zero and N−2.

Referring to FIG. 8, the upper bound on the numeric value of random carry-in value 815 is determined by subtracting two from the number of bit positions defining the height of PPM 802 (i.e. number of bit positions in boundary 805). In the exemplary embodiment, the height of PPM 802 is eight and the requisite range of values for random carry-in value 815 is thus 6 (i.e. eight minus two), which is representable in the three bit positions depicted as representing carry-in value 815. As illustrated in FIG. 7, random adjustment logic unit may be operatively coupled to any number of counter/compressors 710a-710n. Therefore, although FIG. 8 only depicts a carry-in scenario applicable to uncompressed PPM 802, it should be noted that subsequent random carry-in steps may be performed with respect to the resultant series of compressed arrays within partial product reduction unit 208 in accordance with the principles set forth herein.

By replacing lower-order bits 804 with random carry-in value 815 in accordance with the principles described above, the number of counter/compressors 710a-710n within partial product reduction unit 708 and the width of carry-propagate adder 714 can be substantially reduced. In addition, the present random carry-in technique eliminates the need for the hardware and computation overhead required for a final mantissa result rounding step as is required in conventional floating-point multiplier 200.

A method and apparatus have been disclosed for incorporating random carry-in logic to eliminate the need to round floating-point results within a data processing system. Software written according to the present invention is to be stored in some form of computer readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications maybe made by one of ordinary skill in the art without departing from the spirit and scope of the appended claims.

What is claimed is:

1. A method for performing floating-point multiplication with reduced computation overhead in a data processor, comprising:

generating, in the data processor, a partial product array from a pair of floating-point operand mantissas; and compressing, in the data processor, said partial product array within an adder into a compressed mantissa result, wherein said compressing is preceded by replacing a lower-order bit portion of said partial product array with a randomly generated carry-in value within said adder.

2. The method of claim 1, further comprising determining the height of said partial product array, wherein said height is determined as the number of bit positions within a vertical column of bit positions within said partial product array, said vertical column bounded by the least significant bit of the uppermost row and the most significant bit of the lowermost row of said partial product array.

3. The method of claim 2, further comprising determining a requisite range of values of said randomly generated carry-in value in accordance with said determined partial product array height.

4. The method of claim 3, wherein said determining a requisite range of values of said randomly generated carry-in value comprises determining said requisite range in accordance with the relation:

$$R = N-2,$$

wherein N represents the height of said partial product array and R represents the number of bits in which an upper bound of said requisite range is representable.

5. A data processing apparatus for performing floating-point multiplication with reduced computation overhead comprising:

a partial product generator, in the data processing apparatus, for generating a partial product array from a pair of floating-point operand mantissas;

at least one adder, in the data processing apparatus, for compressing said partial product array into a product mantissa result; and a random carry-in logic unit, in the data processing apparatus, coupled to said at least one adder, wherein said random carry-in logic unit replaces a lower-order bit portion of said partial product array with a randomly generated carry-in value within said adder.

6. The apparatus of claim 5, wherein said random carry-in logic includes logic for:

determining the height of said partial product array; and determining a requisite range of values of said randomly generated carry-in value in accordance with said determined partial product array height.

7. The apparatus of claim 6, wherein said logic for determining a requisite range of values of said randomly generated carry-in value determines said requisite range in accordance with the relation:

$$R=N-2,$$

wherein N represents the height of said partial product array and R represents the number of bits in which an upper bound of said requisite range is representable.

* * * * *